United States Patent
Jiang et al.

[11] Patent Number: 5,943,251
[45] Date of Patent: Aug. 24, 1999

[54] ADDER WHICH HANDLES MULTIPLE DATA WITH DIFFERENT DATA TYPES

[75] Inventors: Shao-Kun Jiang, San Diego; Le T. Nguyen, Monte Sereno, both of Calif.

[73] Assignee: Samsung Electronics Co., Ltd., Seoul, Rep. of Korea

[21] Appl. No.: 08/749,619

[22] Filed: Nov. 18, 1996

[51] Int. Cl.⁶ ..................................................... G06F 7/50
[52] U.S. Cl. ................ 364/787.01; 364/786.01; 364/786.02; 364/786.03; 364/786.04; 364/787.02; 364/787.03; 364/787.04; 364/749
[58] Field of Search .................. 364/787.01, 787.03, 364/787.02, 787.04, 786.03, 786.04, 786.02, 786.01, 749

[56] References Cited

U.S. PATENT DOCUMENTS

| | | | |
|---|---|---|---|
| 5,285,406 | 2/1994 | Lynch et al. | 364/787 |
| 5,327,369 | 7/1994 | Ashkenazi | 364/787 |
| 5,418,736 | 5/1995 | Widigen et al. | 364/787 |
| 5,434,810 | 7/1995 | Goto et al. | 364/787 |
| 5,636,156 | 6/1997 | Mikan, Jr. et al. | 364/787 |
| 5,719,802 | 2/1998 | Purcell et al. | 364/787 |

Primary Examiner—Reba I. Elmore
Assistant Examiner—Navin Natnithithadha
Attorney, Agent, or Firm—Skjerven, Morrill, MacPherson, Franklin & Friel LLP; David T. Millers

[57] ABSTRACT

An adder circuit includes various methods to control the carry bit at data boundaries when attempting to process multiple data of multiple types. One method is to generate both propagate and generate signals from the input data and modified propagate and generate signals from the data boundaries, which can then be used in a conventional carry-lookahead adder to produce a resulting sum that is correct regardless of the data type being processed. Another method is to insert special carry blocking, propagating or generating cells at the data boundaries of the input data. These cells are then filled with the appropriate blocking, propagating or generating signals, either by table look-up or circuit implementation using data type and processing type inputs. This data stream can then be added with a conventional adder. However, if the special cell replaces data at the boundaries, another adder can be used to process this boundary data separately prior to inserting the special cell. Instead of using another adder, the data stream may be expanded such that the special cell does not replace any data at the boundaries. The expanded data stream is then processed with a conventional adder capable of handling the expanded width.

16 Claims, 7 Drawing Sheets

| A | B | CARRY |
|---|---|---|
| 0 | 0 | BLOCK (B) |
| 0 | 1 | PROPAGATE (P) |
| 1 | 0 | PROPAGATE (P) |
| 1 | 1 | GENERATE (G) |
FIG. 1
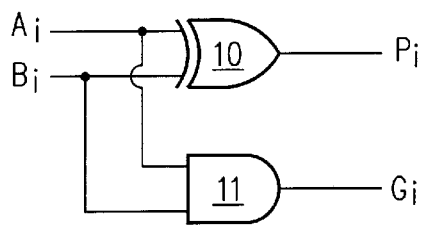
FIG. 2A
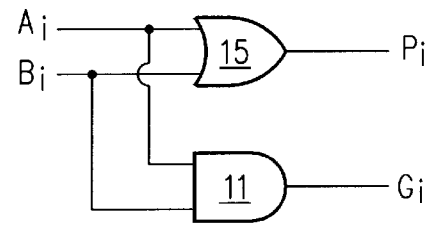
FIG. 2B
| Data Type \ Bit Index | 8 | 17 | 26 |
|---|---|---|---|
| B8 | FB/FG | FB/FG | FB/FG |
| B9 | FB/FG | FB/FG | FB/FG |
| HW | FP | FB/FG | FP |
| WD | FP | FP | FP |
WHERE FB/FG MEANS   FB IS ON FOR ADDITION,
                    FG IS ON FOR SUBTRACTION
FIG. 4

FIG. 3

| Data Type \ Bit Index | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|
| B8 | | | | | | | | | | | | | | | | | | | | | | | | | | | | | 7 | 6 | 5 | 4 | 3 | 2 | 1 | 0 |
| B9 | | | | | | | | | | | | | | | | | | | 8 | 7 | 6 | 5 | 4 | 3 | 2 | 1 | 0 | | 8 | 7 | 6 | 5 | 4 | 3 | 2 | 1 |
| HW | | | | | | | | | | | | | 15 | 14 | 13 | 12 | 11 | 10 | 9 | 8 | 7 | 6 | 5 | 4 | 3 | 2 | 1 | 0 | 15 | 14 | 13 | 12 | 11 | 10 | 9 | 8 |
| WD | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | | | | |

FIG. 5

| FP | FG | FB | A | B | P' | G' |
|---|---|---|---|---|---|---|
| 0 | 0 | 1 | X | X | 0 | 0 |
| 0 | 1 | 0 | X | X | 0 | 1 |
| 1 | 0 | 0 | X | X | 1 | 0 |
| 0 | 0 | 0 | 0 | 0 | 0 | 0 |
| 0 | 0 | 0 | 0 | 1 | 1 | 0 |
| 0 | 0 | 0 | 1 | 0 | 1 | 0 |
| 0 | 0 | 0 | 1 | 1 | 0 | 1 |

| Data Type \ Bit Index | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| B8 | | 7 | 6 | 5 | 4 | 3 | 2 | 1 | 0 | | 7 | 6 | 5 | 4 | 3 | 2 | 1 | 0 | | 7 | 6 | 5 | 4 | 3 | 2 | 1 | 0 | | 7 | 6 | 5 | 4 | 3 | 2 | 1 | 0 |
| B9 | 8 | 7 | 6 | 5 | 4 | 3 | 2 | 1 | 0 | P | 8 | 7 | 6 | 5 | 4 | 3 | 2 | 1 | 0 | P | 8 | 7 | 6 | 5 | 4 | 3 | 2 | 1 | 0 | P | 8 | 7 | 6 | 5 | 4 | 3 | 2 | 1 | 0 |
| HW | 15 | 14 | 13 | 12 | 11 | 10 | 9 | 8 | 7 | 6 | 5 | 4 | 3 | 2 | 1 | 0 | | | | 15 | 14 | 13 | 12 | 11 | 10 | 9 | 8 | 7 | 6 | 5 | 4 | 3 | 2 | 1 | 0 |
| WD | 31 | 30 | 29 | 28 | 27 | 26 | 25 | 24 | 23 | 22 | 21 | 20 | 19 | 18 | 17 | 16 | P | 15 | 14 | 13 | 12 | 11 | 10 | 9 | 8 | 7 | 6 | 5 | 4 | 3 | 2 | 1 | 0 |

CPGBC-29 spans around bits 30-20; CPGBC-19 spans around bits 20-10; CPGBC-9 spans around bits 10-0.

ADDER WHICH HANDLES MULTIPLE DATA WITH DIFFERENT DATA TYPES

BACKGROUND OF THE INVENTION

1. Field of the Invention

This invention relates to an adder circuit, and more particularly to an adder capable of handling multiple data within a data stream without having to reconfigure the adder for different data types.

2. Description of Related Art

Most adders used today in general purpose processors are based on a conventional carry-lookahead adder (CLA). CLAs generate carry bits for all data bits simultaneously rather than one at a time and then wait for each carry bit to ripple through the adder.

The CLA generates the carry bits by using a generate bit $G_i$ and a propagate bit $P_i$, defined as:

$$G_i = A_i \cdot B_i \qquad (1)$$

$$P_i = A_i (+) B_i, \qquad (2)$$

where $A_i$ and $B_i$ are the respective data bits at the ith location for the two data to be added.

In these and subsequent equations, is logical AND and (+) is logical EXCLUSIVE OR.

The carry bit for the ith stage is $C_i = G_i + P_i \cdot C_{i-1}$, where + represents a logical OR operation, which results in recursive expressions for succeeding carry bits based on an initial carry bit $C_{-1}$. For a 4-bit CLA, the carry bits are:

$$C_0 = G_0 + P_0 \cdot C_{-1} \qquad (3)$$

$$C_1 = G_1 + P_1 \cdot G_0 + P_1 \cdot P_0 \cdot C_{-1} \qquad (4)$$

$$C_2 = G_2 + P_2 \cdot G_1 + P_2 \cdot P_1 \cdot G_0 \cdot C_{-1} \qquad (5)$$

$$C_3 = G_3 + P_3 \cdot G_2 + P_3 \cdot P_2 \cdot G_1 + P_3 \cdot P_2 \cdot P_1 \cdot G_0 + P_3 \cdot P_2 \cdot P_1 \cdot P_0 \cdot C_{-1}, \qquad (6)$$

where $C_3$ is the carry out of the most significant bit (MSB) of the adder.

The result of the addition is a 5-bit sum, $C_3\ S_3\ S_2\ S_1\ S_0$, where $$S_i = (A_i(+)B_i)(+)C_{i-1} = P_i(+)C_{i-1}. \qquad (7)$$

As seen from the above expressions, implementation can become costly and impractical due to the large number of fan-in and fan-out requirements when a CLA width increases to handle increasingly larger numbers. Consequently, most general purpose processors now use variations of the above scheme.

Even with the increased operational speed of carry-lookahead adders, processing greater amounts of data in shorter periods of time and simplifying logic complexity are ever-present concerns. One way to further increase processing speed is to increase the data width, i.e. increase the number of data bits that can be handled simultaneously. However, increasing the data width decreases processing efficiency when smaller data fields are used. For example, if the data width is 36 bits, but the data field or word size is 8 bits, the 8-bit words have to be aligned first for processing to begin. Furthermore, the empty data locations remain idle during processing, reducing operational efficiency.

Consequently, these empty data locations can be filled with additional data, for example, three 8-bit words, so that each 8-bit word is operated on simultaneously and independently with the other 8-bit words. However, problems arise at the boundaries of the 8-bit words. If a 36-bit adder operates on two 36-bit data streams of four 8-bit words each (A1[7:0], A2[16:9], A3[25:18], A4[34:27] and B1[7:0], B2[16:9], B3[25:18], B4[34:27]), the resultant 36-bit sum may not be correct if carry bits are propagated between any two adjacent 8-bit words. (Note: The 36-bit data stream used throughout the description is divided into four 9-bit groupings, with the first 8 bits being data bits, and is not meant to constitute the only type contemplated by the invention.) Therefore, carry bits must be blocked at the boundaries between each 8-bit word, i.e., at bit locations 8, 17 and 26.

A similar situation arises when two 16-bit words (A1[16:0] and A2[34:18]) are added simultaneously to another pair of 16-bit words (B1[16:0] and B2[34:18]). But now, carry bits at boundary positions 8 and 26 must be propagated, while only the carry bit at boundary position 17 is blocked. This type of adaptive gating within a data stream requires special custom designed adders to accommodate multiple data of multiple data types. Custom adders increase both the time and cost of producing multiple data type processors.

An adder circuit which can handle multiple data with multiple data types without a significant decrease in operational speed or increase in complexity is desired.

SUMMARY OF THE INVENTION

In accordance with the invention, an adder circuit includes methods of controlling the carry bit at data boundaries when processing multiple data of multiple data types, where the data boundaries are located between each byte. The two operands of input data are N bits wide, both having k bytes. Depending on the data type, k ranges from 1 to $2^n$, with each byte being at most N/k bits wide. The data boundaries are therefore located at every $N/2^n$ bit location within the input data.

In one embodiment, modified propagate (P') and generate (G') logic is added at the data boundaries, along with conventional P and G logic elsewhere. Depending on the data type (length of byte) and processing type (addition or subtraction), carry bits must be blocked, propagated or generated at these boundary locations. Because carry bits are generated using propagate (P) and generate (G) signals, i.e., $C_i = G_i + P_i \cdot C_{i-1}$, P' and G' can be used to set the appropriate carry at the data boundaries. The rest of the data processing is performed with conventional methods.

Another method for controlling carries at data boundaries involves inserting a special cell at the boundary locations. Signals are placed in these cells to effectuate the required carry block, propagate or generate function. The signals can be directly inserted using a table look-up or they can be inserted using logic based on the data type and processing type. The operands with the special cells are then processed with conventional adders. However, if data at the boundaries are lost due to the insertion of the special cells, an additional adder must be included. In this case, the boundary data is first processed by the additional adder before the special cells are inserted. These results are combined with the main adder to yield a correct output when the special cell replaces boundary data.

Another embodiment, similar to the previous method, removes the requirement of an additional adder. The data stream is widened or expanded so that the special cells will not replace any data at the boundary locations. However, carry bits may now have to be propagated at additional bit locations due to the wider data stream. The data is processed by a larger adder, able to accommodate the expanded bit stream.

Therefore, the first embodiment requires special logic, while the second and third embodiments require either an additional adder or expanded data streams and processors, but all allow the system to handle multiple data of multiple data types.

BRIEF DESCRIPTION OF THE DRAWINGS

FIG. 1 is a table showing the relationship between input data and carry block, propagate and generate variables.

FIGS. 2A and 2B are equivalent logic diagrams for implementing the propagate and generate variables.

FIG. 3 is a table showing data locations within a 36-bit data stream for various data types in one embodiment of the invention.

FIG. 4 is a table showing values for input variables at specific bit locations, dependent on the data type and data operation, for the data stream in FIG. 3.

FIG. 5 is a table showing the relationship between input variables and data and modified propagate and generate variables.

FIG. 9 is a table showing data locations within a 36-bit data stream for various data types in an alternative embodiment.

FIG. 10 is a table showing values for input variables at specific bit locations, dependent on the data type and data operation, for the data stream in FIG. 9.

Use of the same reference symbols in different figures indicates similar or identical items.

DETAILED DESCRIPTION OF THE PREFERRED EMBODIMENTS

Figure 6:
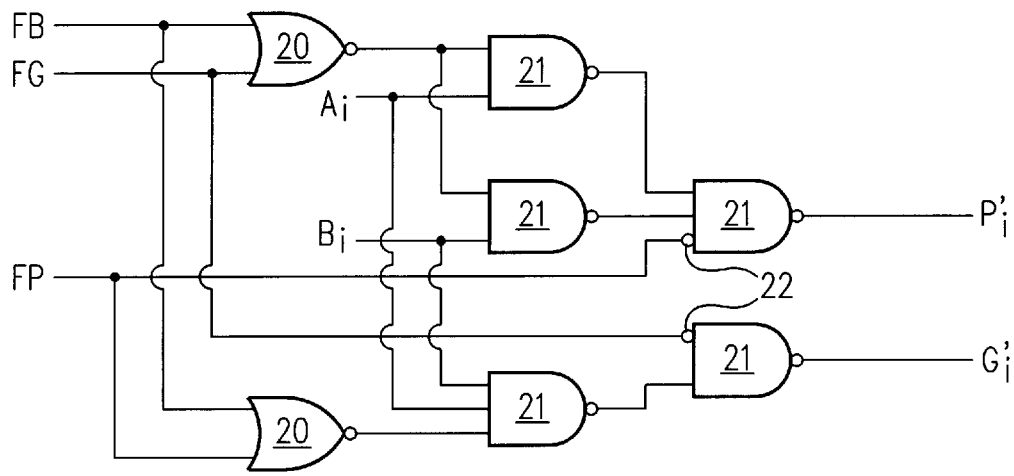
FIG. 6 is a logic diagram for one implementation of FIG. 5.

The present invention provides an adder which modifies data at data boundaries in order to process multiple data without having to reconfigure the adder for each data type. An N-bit adder receives a pair of N-bit input data streams. Each data stream contains k bytes, where k ranges from 1 to $2^n$ depending on the data type, and each byte contains at most N/k bits. Data boundaries are located between bytes, at every $N/2^n$ bit location. One embodiment modifies propagate and generate variables at these boundary locations before performing conventional processing. An alternative embodiment modifies data at these boundary locations and can include an additional carry-select adder.

FIG. 1 is a truth table for carry block, propagate and generate variables. The carry block (B) prevents a carry bit from propagating to the next data location. If input data at the ith bit is $A_i=0$ and $B_i=0$, the carry bit from the i location to the i+1 location will always be blocked because $A_i+B_i$ will never result in a carry bit. On the other hand, the carry generate (G) always propagates a carry bit to the next location, which requires $A_i=1$ and $B_i=1$, while the carry propagate (P) only propagates a carry if there is a carry-in, requiring one input to be 0 while the other input is 1. G and P are given in equations 1 and 2 above.

FIG. 2A shows a conventional way of implementing the propagate and generate variables, using an XOR gate 10 and an AND gate 11. However, P may also be implemented using an OR gate 15, as shown in FIG. 2B. The only logical difference is when $A_i$ and $B_i$ both equal 1, in which instance $P_i=1$ instead of 0. Either circuit can be used. Referring to the carry bit equations 3–6 above, when the inputs are both 1, a carry bit is generated by G, and the value of P is ignored in this situation. Some implementations use P to generate the sum data bits. In that instance, an XOR gate must be used since $S_i = A_i (+) B_i (+) C_{i-1} = P_i (+) C_{-1}$ only if $P_i = A_i (+) B_i$.

To better understand the invention, a general purpose processor with a 36-bit adder capable of handling multiple data of four data types will be used for illustration purposes. FIG. 3 shows a format of input operands in a 36-bit data stream for the four data types, an 8-bit word or byte (B8), a 9-bit word (B9), a 16-bit half word (HW), and a 32-bit full word (WD). In this case, N=36 and n=2 since there can be at most four bytes in the data stream (for B8 and B9 data types). The present invention handles data at the data boundaries, every 9 bit location ($N/2^n$), i.e., bits 8, 17 and 26 since 0 is the first bit location. No special handling is needed at bit 35, which is the most significant bit (MSB) or carry-out bit for B8, HW and WD data types and a data bit for B9 data type, because no data follows bit 35. Thus, by either blocking, propagating, or generating carry bits at the boundaries depending on the data type, an adder can correctly process multiple data of different types.

In one embodiment, a conventional adder is altered to produce modified propagate and generate variables at the data boundaries, which are described with reference to FIGS. 4–8. At the boundary locations 8, 17 and 26 of FIG. 3, carry bits must be forced-to-be-blocked (FB), forced-to-propagate (FP) or forced-to-generate (FG). FIG. 4 shows the appropriate forcing functions for the four data types at the data boundaries. For example, for a 16-bit HW data type, a carry bit from bit position 8 and 26 must be propagated to respective bit positions 9 and 27 because bit positions 9 and 27 are continuations of the HWs from bit positions 7 and 25. However, a carry bit at position 17 must be blocked from propagating to bit position 18, which is the LSB for the next HW. But, if the operation is subtraction, a carry-in bit has to be generated at the LSB for each new word in order to perform subtraction with 2's complement. In this conventional method, the 2's complement of the subtrahend is added to the minuend, where the complement is obtained from interchanging the 1's and 0's and adding a 1 to this result, via the carry-in bit.

Normal propagate and generate variables are obtained from data inputs as shown in FIGS. 1–2B.

Modified propagate and generate variables are now used at the data boundaries in the present invention to process multiple data types. Because bit positions 8, 17 and 26 can contain actual operand data (for a 36-bit word) or be forced to block, propagate or generate carry bits (for B8, HW and WD) as illustrated in FIG. 4, modified propagate P' and generate G' variables depend on $A_i$ and $B_i$ as well as FB, FP and FG. FIG. 5 shows the relationships, where X indicates "don't care". Based on FIG. 5, possible expressions for P' and G' are as follows:

$$P_i' = FP + \overline{FB} \cdot FG \cdot (A_i + B_i) \tag{8}$$

$$G_i' = FG + \overline{FP} \cdot \overline{FB} \cdot A_i \cdot B_i, \tag{9}$$

where i=8, 17 and 26.

FIG. 6 shows one possible implementation of equations 8 and 9, where inputs FB, FG, FP, $A_i$, and $B_i$ are connected to NOR gates 20, NAND gates 21, and inverters 22. The logic diagram in FIG. 6 takes into account that A (+) B can be replaced functionally by A+B, as discussed above. Furthermore, the propagation delay in generating P' and G' can be minimized by reducing the number of gates that $A_i$ and $B_i$ have to go through since FB, FP and FG are available to the adder before the data inputs A and B.

Figure 7:
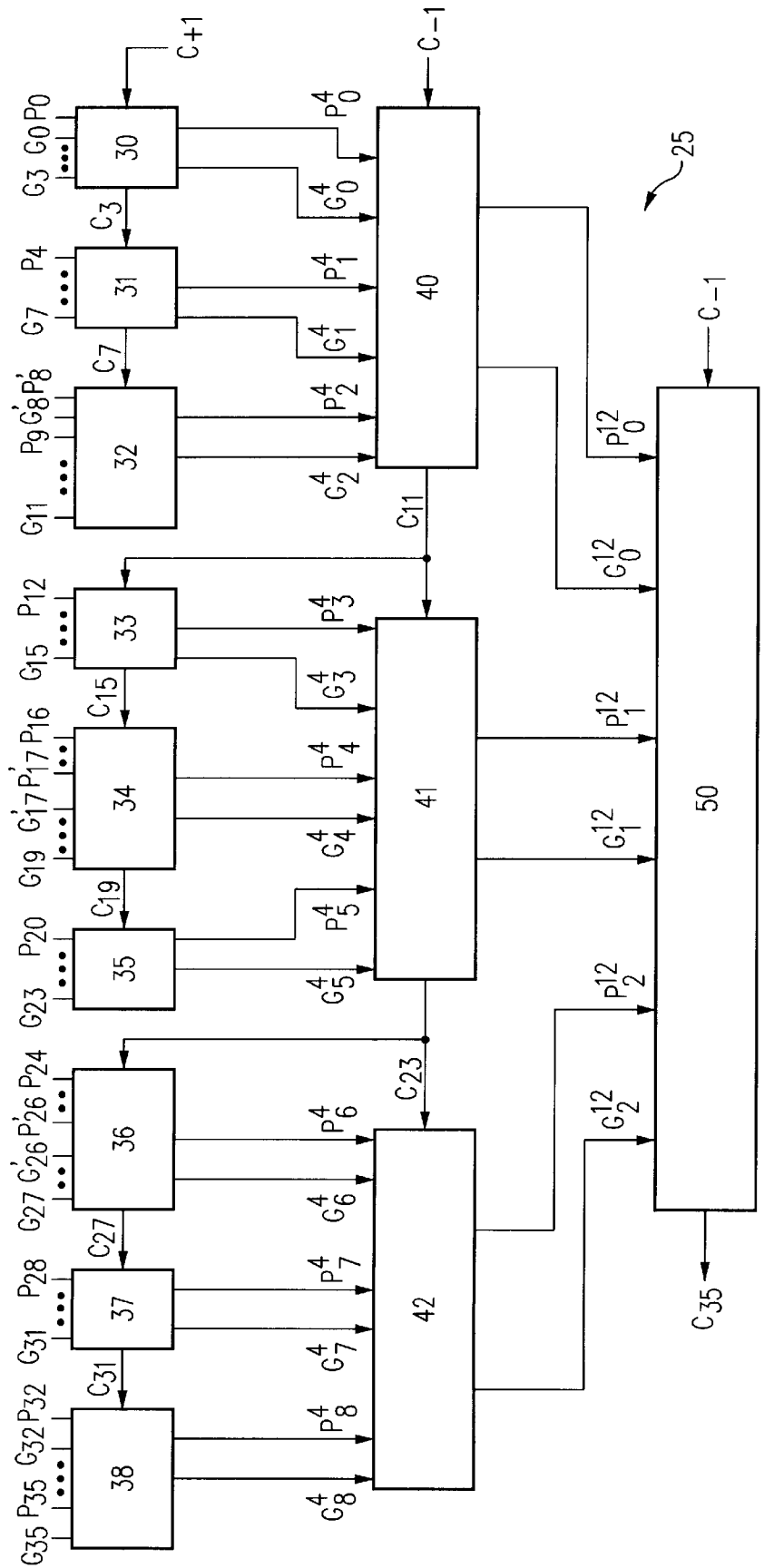
FIG. 7 is a block diagram of a carry-lookahead generator for one embodiment of the invention.

The conventional P and G variables and the modified P' and G' variables described above are then used for conventional group P and G generation to obtain all the carries. FIG. 7 shows 36-bit block carry-lookahead generator (CLG) 25 for illustration purposes, with nine 4-bit block CLGs 30–38 in the first level, three 3-bit block CLGs 40–42 in the second level, and one 3-bit block CLG 50 in the last level. For example, CLG 25 can accept input signals from circuits in FIG. 2A or 2B and FIG. 6 to provide the necessary P and G and P' and G' signals, respectively. Any conventional generator can be used to accept P and G and P' and G', as well as any type of grouping, i.e., twelve 3-bit blocks, grouped into four 3-bit blocks, grouped into two 2-bit blocks, grouped into one 2-bit block. Block generation reduces the excessive fan-in and fan-out requirements needed for large data streams, as discussed above.

In FIG. 7, $P_0$ to $P_3$ and $G_0$ to $G_3$ are inputted to carry-lookahead generator 30, along with a carry-in $C_{-1}$, which is 0 for addition and 1 for subtraction. CLG 30 then outputs a carry-out $C_3$ of the group's MSB to CLG 31 according to equations 3–6 above. The carry-out of each CLG is inputted as the carry-in to the next CLG within the block. At the data boundaries, P' and G' are inputted instead of the conventional P and G. Therefore, $P_8'$ and $G_8'$ are inputted to CLG 32 along with $P_9$ to $P_{11}$ and $G_9$ to $G_{11}$.

The first level CLGs also output 4-bit group propagate and generate variables, i.e., for group 0, they are $P_0^4$ and $G_0^4$, defined as:

$$P_0^4 = P_3 \cdot P_2 \cdot P_1 \cdot P_0 \text{ and}$$

$$G_0^4 = G_3 + P_3 \cdot G_2 + P_3 \cdot P_2 \cdot G_1 + P_3 \cdot P_2 \cdot P_1 \cdot G_0.$$

Similarly $P_1^4$, $G_1^4$, $P_2^4$, and $P_2^4$ are calculated and these 4-bit group propagate variables are inputted to a second level CLA 40, which generates a carry output $C_{11}$ and 12 bit group propagate variables $p_0^{12}$ and $G_0^{12}$. Carry output $C_{11}$ is inputted into both CLA 33 in the first level and CLA 41 in the second level. This structure thus generates all the carry bits $C_0$ to $C_{35}$. Sum bits can also be generated by conventional methods using equation 7 above.

Figure 8:
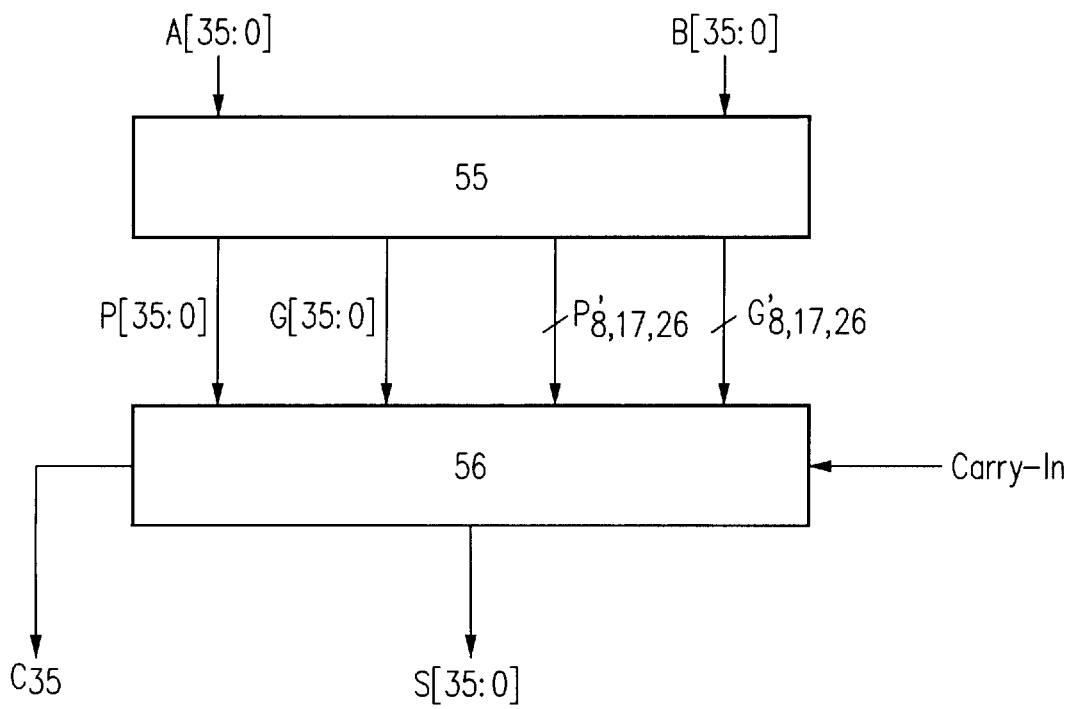
FIG. 8 is a block diagram showing an adder for one embodiment of the invention.

FIG. 8 shows a block diagram with a propagation and generation circuit 55 for providing unmodified and modified P and G variables to a carry-lookahead adder 56, which includes carry-lookahead generator 25, for outputting a summed result. As a result, by modifying the propagate and generate variables at data boundary locations and using conventional adders, a general purpose processor has the capability of processing multiple data within a data stream for multiple types of data, i.e., the same general purpose processor can process operands consisting of four 8-bit words, four 9-bit words, two 16-bit words or one 32-bit word.

In another embodiment of the present invention, data at boundary locations are handled slightly differently. Instead of implementing a special circuit for modifying P and G, this embodiment inserts special cells at the boundary locations within the data stream to block, propagate or generate carry bits and then includes another conventional adder to handle special types of data. Again, the same 36-bit data stream will be used as an example to illustrate the aspects of this embodiment.

Figures 9, 10:
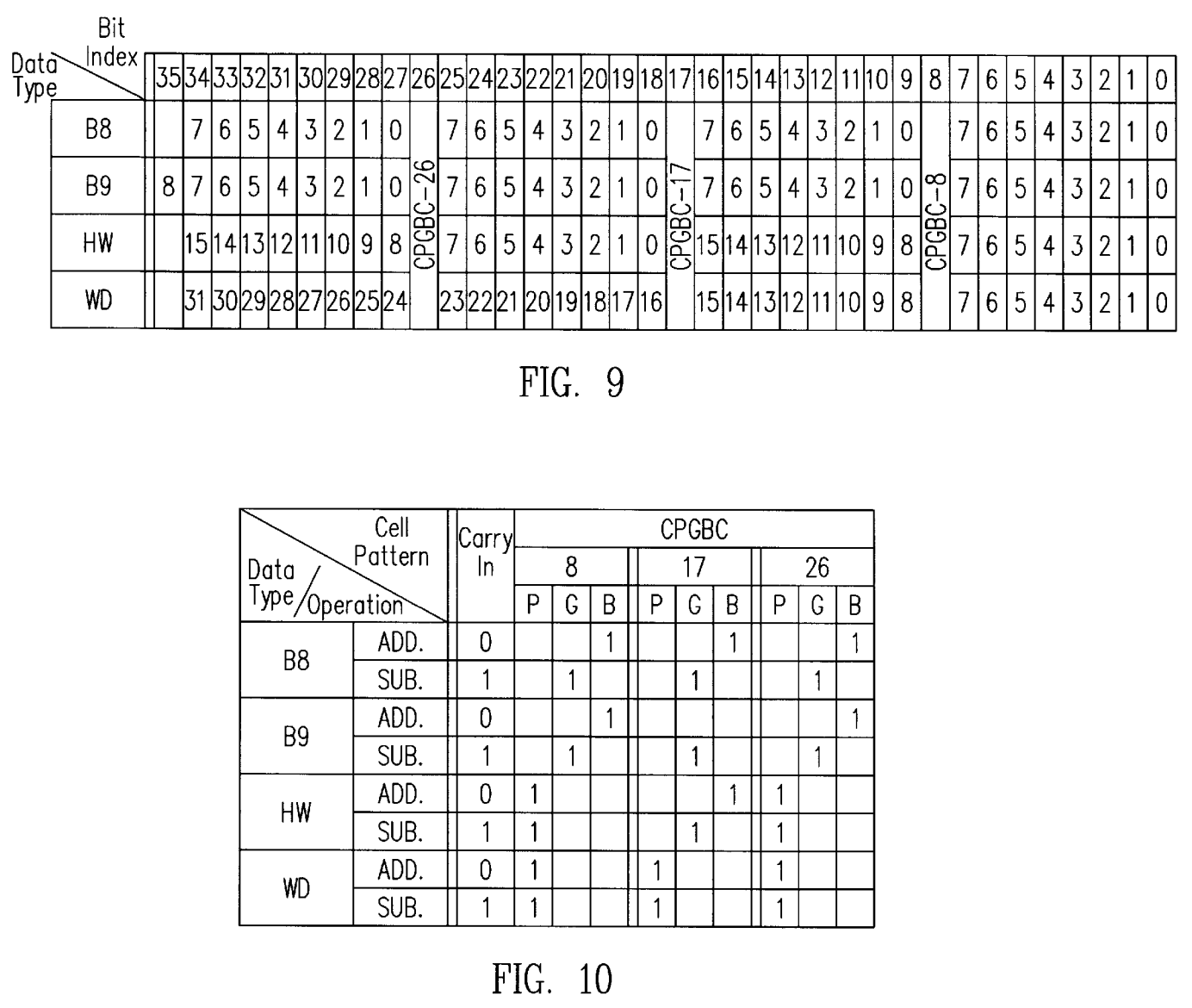

FIG. 9 shows a format of input operands in a 36-bit data stream for the four data types, B8, B9, HW, and WD. Carry propagate, generate, and block cells (CPGBC) are inserted at bit positions 8, 17 and 26 to handle the carry propagate, generate and block functions at the data boundaries. This format is similar to the one in FIG. 3, except that the CPGBCs now remove the data bit for B9 type data at positions 8, 17 and 26. Therefore, B9 data at these locations are handled separately.

The CPGBCs are used to force carries to be blocked, propagated or generated at the boundary locations. Therefore, analogous to FIG. 4, FIG. 10 shows the required B, P, and G functions at the boundary locations, depending on data type and processing operation (addition or subtraction). Logic equations follow from FIG. 10 for each CPGBC location:

For bit 8:

$$P = HW + WD \tag{10}$$

$$G = (B8 + B9) \cdot \text{Sub} \tag{11}$$

$$B = (B8 + B9) \cdot Ad \tag{12}$$

For bit 17:

$$P = WD \tag{13}$$

$$G = (B8 + B9 + HW) \cdot \text{Sub} \tag{14}$$

$$B = (B8 + B9 + HW) \cdot \text{Add} \tag{15}$$

For bit 26:

$$P = HW + WD \tag{16}$$

$$G = (B8 + B9) \cdot \text{Sub} \tag{17}$$

$$B = (B8 + B9) \cdot \text{Add} \tag{18},$$

where Sub and Add represent the processing operation desired.

It should be noted that equations 10–18 can also be used to supply the signals for FB, FG and FP in equations 8–9 and the circuit in FIG. 6, so that the data type and processing operation are inputs rather than FB, FG and FP.

Once the desired B, P or G function is obtained, the CPGBCs are inserted with the appropriate data according to FIG. 1. For example, if the general purpose processor is subtracting B8 type data, 1's are inserted into CPGBCs at bit locations 8, 17 and 26 for the two operands A and B to generate carry bits. The 36-bit data stream is then processed according to conventional methods.

Figure 11:
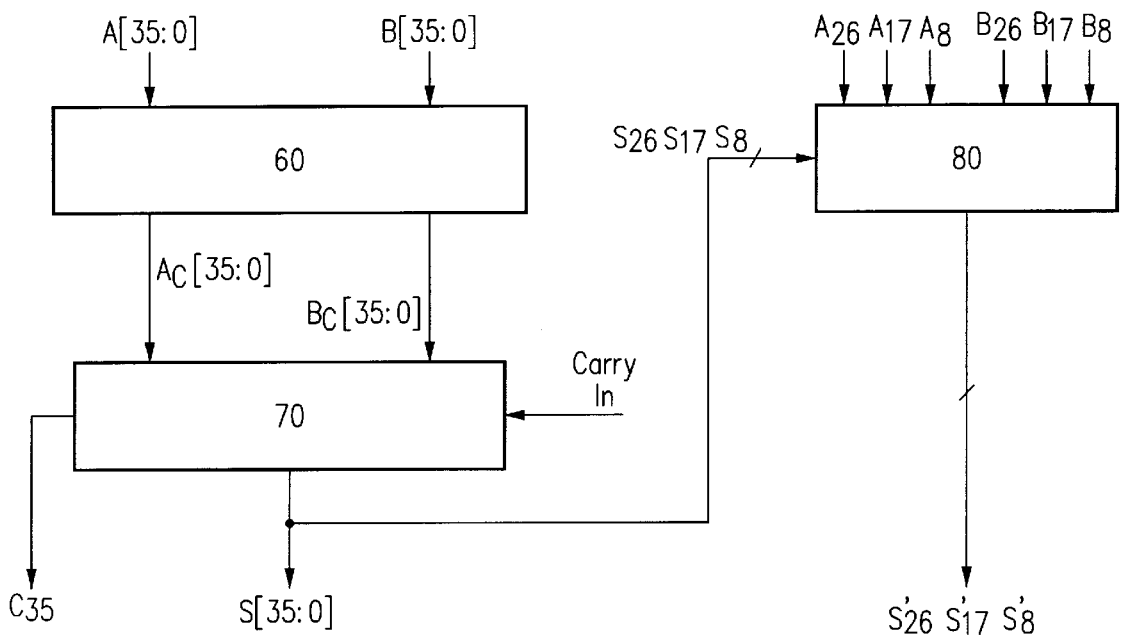
FIG. 11 is a block diagram of an adder for an alternative embodiment.

FIG. 11 shows a block diagram of an adder in this alternative embodiment. The operands A and B are modified through circuit 60, which inserts CPGBCs at bit locations 8, 17 and 26 and inserts appropriate bits in these cells according to the type of function required and data type, either through equations 10–18 or through a look-up table in FIG. 10. Circuit 60 then inputs operands $A_c$ and $B_c$, containing the CPGBCs, into a conventional 36-bit adder 70. $A_c$ and $B_c$ are then added to obtain both a 36-bit sum output S[35:0] and a carry-out $C_{35}$. The adder 70 also accepts a carry-in bit for subtraction. If subtraction is performed, the subtrahend is 1's complemented, incremented with a carry-in bit equal to 1, and added to the minuend. In either operation, $S_8$, $S_{17}$ and $S_{26}$ are ignored for B8, HW and WD data types, as they represent the addition of the CPGBCs and not actual operand data from A and B.

However, as noted earlier, B9 data type must be handled separately because the CPGBC replaces the MSB data of B9 type data. Therefore, as further shown in FIG. 11, the system contains another adder 80, which processes B9 data at bit positions 8, 17 and 26 before the CPGBCs replace the data. Adder 80 also uses $S_8$, $S_{17}$ and $S_{26}$ to determine whether the B9 data receives carry-in bits. The resulting output bit of adder 80 represents the MSB of processing B9 data types, which can then be combined with the output bit of adder 70 to obtain the final result for B9 data types.

Figure 12:
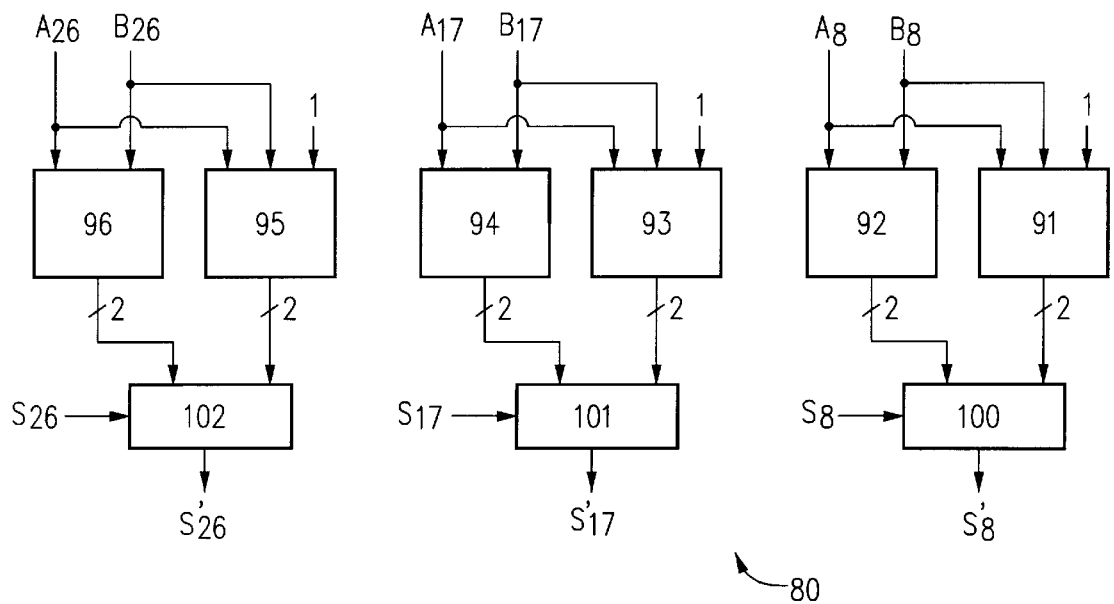
FIG. 12 is a more detailed block diagram of the block 80 in FIG. 10.

FIG. 12 is a block diagram of adder 80 in FIG. 11. FIG. 12 shows a series of carry-select adders, although other conventional adders can also be used. Adder 80 includes three carry-select adders, each containing a full-adder 91, 93 or 95, a half-adder 92, 94 or 96, and a multiplexer 100, 101 or 102. Before the CPGBCs are inserted, the boundary data bits of B9 data are added together. For each data pair, the carry-select adder generates a result representing the sum with a carry-in bit and a result representing the sum without a carry-in bit. Both sums are made available to a multiplexer, which uses the sum result from the CPGBC or carry into the CPGBC bit to choose the appropriate sum to output. For example, if $S_8=1$, then multiplexer 100 selects the output from full-adder 91 because $S_8=1$ indicates that adding $A_7$ and $B_7$ produces a carry into position 8. This follows from the fact that CPGBCs at position 8 are both 0 or 1 because B9 data can only have carry block or generate at that location. Therefore, if position 7 produces a carry, $S_8$ equals 1; otherwise $S_8$ equals 0 if no carry is present.

Adder 80 is only required to handle B9 data types. Thus, a general purpose processor may be simplified if B9 data types are not used, allowing removal of adder 80. However, if B9 data processing is desired, another embodiment of the present invention does not require an additional adder, but does require expanding the data stream so that the CPGBCs do not displace any operand data.

Figures 13, 14:
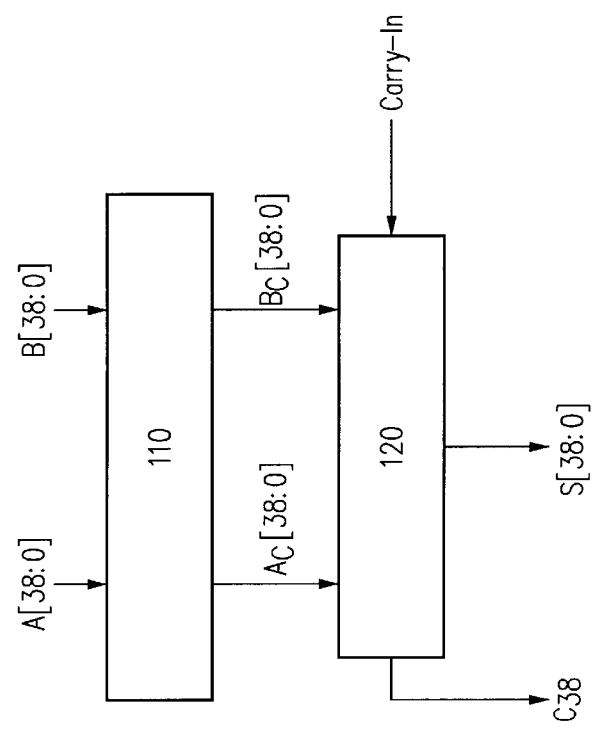
FIG. 13 is a table showing data locations within a 39-bit data stream for various data types in another embodiment of the invention.
FIG. 14 is a block diagram of an adder for the data stream of FIG. 13.

Continuing with the four data type example, FIG. 13 shows how the original 36-bit data stream is expanded to a 39-bit data stream for the four data types, B8, B9, HW, and WD, in order to accommodate the CPGBCs. Expanding the data stream also requires using a larger adder, so that a 39-bit adder is now needed for processing the data. The CPGBCs are now located at bit positions 9, 19 and 29 and follow the same logic and implementation as discussed above with respect to the 36-bit data stream. FIG. 13 also shows that by expanding the data stream, additional carries must be propagated within words, i.e., for HW data types, carries at bit positions 8 and 28, and for WD data types, carries at bit positions 8, 18 and 28. Propagation is accomplished by inserting the appropriate bits at these locations according to FIG. 1.

As shown in FIG. 14, CPGBCs are inserted in the 39-bit data stream at block 110 and then processed through conventional 39-bit adders 120, similar to the system in FIG. 11. However, now sum bits $S_9$, $S_{19}$ and $S_{29}$ are ignored for all four data types, and additional data bits exist in the data stream according to FIG. 13. But B9 data types can now be processed in the main adder and do not require a special separate adder.

Although the present invention has been described with reference to particular embodiments, the description is only an example of the invention's application and should not be taken as a limitation. Various adaptations and combinations of features of the embodiments disclosed are within the scope of the present invention as defined by the following claims.

We claim:

1. An adder circuit comprising:

a first circuit coupled to receive first and second input data, process the input data and output modified data, wherein the input data are N bits wide, both input data having k bytes, and each byte being at most N/k bits wide, and wherein the processing modifies propagate and generate bits at data boundaries, the data boundaries being located at every 9th bit location within the input data; and an adder coupled to receive the output modified data, add the output modified data together, and provide an (N+1) bit summed result.

2. The adder circuit of claim 1, wherein the first circuit comprises:

a second circuit for combining the input data to provide first propagate and generate signals; and a third circuit coupled to receive boundary data and boundary variables for combining the boundary data and boundary variables to provide the modified propagate and generate signals at the data boundaries, wherein the boundary data are located at every 9th bit location.

3. The adder circuit of claim 2, wherein the adder comprises a fourth circuit coupled to the first and the modified propagate and generate signals for combining the propagate and generate signals to provide the summed result.

4. The adder circuit of claim 3, wherein the adder comprises a carry-lookahead circuit for combing the first and the modified propagate and generate signals to provide carry signals.

5. The adder circuit of claim 2, wherein the boundary variables comprise signals to force block, propagate or generate the carry signals at the data boundary locations.

6. The adder circuit of claim 5, wherein the boundary variables are provided from signals defining the byte width and the type of input data processing, addition or subtraction.

7. An adder circuit comprising:

a first circuit coupled to receive first and second input data, process the input data and output modified data, wherein the input data are N bits wide, both input data having k bytes, and each byte being at most N/k bits wide, and wherein the processing insert block, propagate or generate carry signals into data boundaries, the data boundaries being located at every 9th bit location within the input data, and an adder coupled to receive the output modified data, add the output modified data together, and provide an (N+1) bit summed result.

8. The adder circuit of claim 7, wherein the block, propagate and generate carry signals are provided from signals defining the byte width and the type of input data processing, addition or subtraction.

9. The adder circuit of claim 7, further comprising a second circuit coupled to the adder and the data boundaries of the input data to provide a partial summed result at the data boundaries when the first and second input data have data bits at the data boundaries.

10. The adder circuit of claim 9, wherein the third circuit comprises:

a full-adder coupled to the data boundaries of the input data and to a high-level signal to provide a first intermediate result;

a half-adder coupled to the data boundaries of the input data to provide a second intermediate result; and a multiplexer coupled to the full-adder, the half-adder, and the adder wherein the multiplexer selects either the first or second intermediate result, depending on the existence of carry-in bits at the data boundaries.

11. The adder circuit of claim 1, wherein the first and second input data widths are expanded such that no input data exists at the data boundary locations.

12. A method for adding, comprising:

generating propagate and generate carry signals from first and second input data, wherein the input data are N bits wide, both input data having k bytes, and each byte being at most N/k bits wide;

generating modified propagate and generate carry signals from boundary data and boundary variables to block, propagate or generate carry signals at the data boundaries, wherein the boundary data and the data boundaries are located at every 9th bit location; and processing the propagate and generate carry signals and the modified propagate and generate carry signals to provide summed result signals.

13. The method for adding according to claim 12, wherein the boundary variables are signals to force the carry signals at the data boundaries to be blocked, propagated or generated.

14. The method for adding according to claim 13, wherein the boundary variables are generated with signals defining the byte width and the type of input data processing, addition or subtraction.

15. A method for adding, comprising:

modifying first and second input data by inserting signals to block, propagate or generate carry signals at data boundaries of the input data, wherein the input data are N bits wide, both input data having k bytes, and each byte being at most N/k bits wide, and wherein the data boundaries are located at every 9th bit location within the input data; and adding the modified input data to provide summed result signals.

16. The method for adding of claim 15, further comprising the step of:

adding the input data at the data boundaries before modifying the input data to provide data boundary output signals.

* * * * *